May 11, 1943.     C. R. FORDYCE ET AL     2,319,055
HIGH SPEED METHOD OF MAKING CELLULOSE ORGANIC
DERIVATIVE FILM AND SHEETING
Filed Dec. 10, 1938     2 Sheets-Sheet 1

CHARLES R. FORDYCE
AUSTIN J. GOULD
INVENTORS

BY
ATTORNEYS

May 11, 1943. C. R. FORDYCE ET AL 2,319,055
HIGH SPEED METHOD OF MAKING CELLULOSE ORGANIC
DERIVATIVE FILM AND SHEETING
Filed Dec. 10, 1938 2 Sheets-Sheet 2

CHARLES R. FORDYCE
AUSTIN J. GOULD
INVENTORS

Patented May 11, 1943

2,319,055

UNITED STATES PATENT OFFICE 2,319,055

HIGH SPEED METHOD OF MAKING CELLULOSE ORGANIC DERIVATIVE FILM AND SHEETING

Charles R. Fordyce and Austin J. Gould, Rochester, N. Y., assignors to Eastman Kodak Company, Rochester, N. Y., a corporation of New Jersey Application December 10, 1938, Serial No. 245,023

10 Claims. (Cl. 18—57)

This invention relates to a high speed method of making attenuated cellulose derivative products, such as film and sheeting, and more particularly to a method of making such products which is characterized by the use of cellulose organic acid ester compositions of hitherto unknown properties.

This application is in part a continuation of our copending application Serial No. 159,532, filed August 17, 1937.

As is well known, cellulose derivative sheets or films are ordinarily produced by depositing a cellulose derivative solution or dope in the form of a film on the highly polished surface of a slowly rotating wheel or band, causing the film to set by evaporation of solvent, stripping the film and curing out residual solvent. The dope compositions heretofore employed for this purpose have been solutions which "set" or reach a solid or semi-solid condition, permitting removal from the forming surface only by gradual evaporation of solvent. With such dopes most of the solvent must be removed (leaving not much more than 20–25% of solvent, based upon the weight of the sheet) before satisfactory stripping of the film can be accomplished. This necessitates a relatively long period of preliminary curing on the wheel. Furthermore, the length of time required for proper setting is increased by the fact that, since such dopes remain fluid or semi-fluid until most of the solvent has evaporated (and, therefore, must be supported on the wheel surface), evaporation of solvent can take place only from the outside surface of the deposited film. In addition, such dopes tend to skin over on the outside surface because of more rapid loss of solvent from the upper layers of film material and this further increases the setting time.

The advantages of bringing the film material into a solid or semi-solid condition as early in the film-forming operation as possible are apparent. Obviously, any reduction in the stripping time, that is, the time during which the film must remain on the wheel before it can be properly stripped, directly increases production speed. Moreover, if the film can be removed from the wheel while still containing considerable solvent, more rapid curing can be attained, because under such conditions the film can be so handled and treated as to permit curing out of solvent from both surfaces simultaneously. An additional advantage is that early solidification or colloidization results in a preferred micellar mat-like structure with attendant improvement in the quality of the finished product. The ideal film-forming operation would, therefore, be one in which the dope could be brought, immediately after casting, into a set or non-fluid condition while still containing all, or nearly all, of its original solvent—a condition which would permit almost immediate stripping (thus reducing stripping time to a minimum) and curing solvent from both surfaces of the film simultaneously.

Numerous attempts have been made to realize this ideal. For example, it has been proposed to use mixtures of low and high-boiling solvents in the dope, so chosen that by rapidly evaporating the low boiling component a very concentrated solution of the cellulose derivative in the high boiling component would remain. It has also been proposed to coagulate cellulose derivative solutions by means of non-solvent liquids or vapors. While such expedients have resulted in some improvement, until the advent of the present invention the ideal operation has never been attained.

As a further indication of the state of the art, it may be said that the broad phenomenon of gelation of certain types of cellulose derivative solutions under the influence of temperature change has been observed from time to time by various workers in the cellulosic field. It has been recognized, for example, that certain organic liquids which are non-solvents for cellulose acetate and other cellulose organic acid esters at ordinary temperatures become solvents at elevated or moderately elevated temperatures and that if solutions are formed at the higher temperatures and coated on a metal or other surface and cooled down, a tenaciously adhering lacquer coating results. It has also been recognized that by heating a suspension of cellulose acetate in ethylene dichloride (a cellulose acetate non-solvent at ordinary temperatures) to about 30–60° C., the cellulose acetate goes into solution to form a clear solution and when such a solution is coated on a surface, cooled and cured to remove the solvent, a clear transparent film results. In other words, while a hot ethylene chloride solution of cellulose acetate will gel upon coating or casting upon a film-forming surface, this phenomenon does not increase the speed of production of sheeting therefrom because such a film cannot be stripped and handled while containing any more solvent than the ordinary cellulose acetate dope wherein acetone and the like are solvents. In other words the gel so formed is not self supporting. Workers in this field have never gone much beyond a recognition of the mere phenomenon that certain dopes are capable of gelling and others are not. Until the present invention, no practical application of the phenomenon of gelation to film-forming operations has ever been made.

This invention has as an object to provide a high speed method of making cellulose derivative sheeting adapted for use as photographic film support and for other purposes. A further object is to provide a method of making cellulose organic acid ester film or sheeting by coating or casting a dope on a film-forming surface, characterized by the fact that the film may be removed or stripped from the surface while still containing a large proportion of solvent. A still further object is to provide a method of making such film or sheeting in which film formation takes place almost immediately upon deposition of the dope. Another object is to provide a method of cellulose ester film or sheet formation in which the film can be removed from the forming or casting surface almost immediately after gelation while containing large proportions of solvent and is in such condition that residual solvent may readily be cured out of both surfaces simultaneously. Another object is to produce cellulose organic derivative sheeting having high tensile strength and flexibility and a low swell and shrink amplitude. Other objects will appear hereinafter.

These objects are accomplished by the following invention which, in its broader aspects, comprises dissolving at elevated or moderately elevated temperatures certain cellulose mixed organic acid esters such as certain cellulose acetate propionates, and cellulose acetate butyrates in a solvent consisting of propylene chloride, certain combinations of ethylene chloride with propylene chloride and/or butylene chloride or of propylene chloride with butylene chloride, whereby a solution or dope is obtained which is susceptible of gelation by a rapid lowering of temperature, and a sheet or film resulting from such gelation has such strength in the gel state that it may be stripped from the casting surface almost immediately after casting and while still containing nearly all or at least a large proportion of the original hot solvent.

We have found that solutions of this character, the composition and preparation of which will be described in more detail hereinafter, possess certain unusual and unexpected characteristics which render them outstanding for the specific purposes of the instant invention. Among other things, (1) they are fluid at temperatures above 50° C.; (2) when allowed to cool to or below a critical temperature between 10°–50° C. (depending upon the composition) they form entirely transparent gels which remain homogeneous throughout the gelling operation, such gelation occurring within approximately 20° C. of the lowest flowable solution point; (3) the gels when first formed do not adhere strongly to surfaces such as metal, glass, etc.; (4) the gels are sufficiently strong and resistant to deformation that they can be handled while still containing large quantities of solvent, i. e. an amount of solvent equal to or greater than the weight of the cellulose ester; (5) the nature or structure of the gels is such that they readily release their volatile solvents and the solvent can be driven off without employing high temperatures.

Inasmuch as it is necessary only to coat or cast the warm solution, cool, and strip almost immediately (due to the fact that the cold-setting or gelation effect produces at once a strong tough gel), an unusual and wholly unexpected increase in film-forming speed is attained. When one takes into account the fact that ordinary film-forming processes generally involve the use of dopes which require in some cases as much as fifteen or twenty minutes preliminary curing on the casting wheel or other surface before the material reaches a stage in which it can be successfully stripped, the tremendous increase in manufacturing speed made possible by the present method will be apparent.

In the following examples and description we have set forth several of the preferred embodiments of our invention, but they are included merely for purposes of illustration and not as a limitation thereof.

Figure 2:
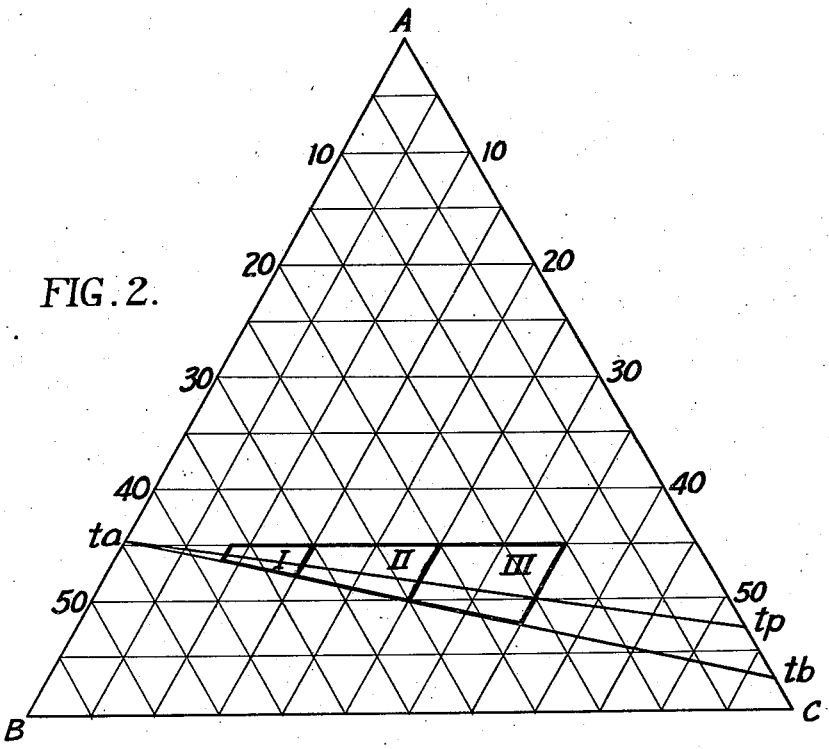
Fig. 2 is a chart showing graphically the various cellulose mixed organic acid esters and the various "hot" solvent mixtures which may be employed within the teachings of our invention.

Referring first to Fig. 2, it is a triangular chart to identify the chemical composition of the cellulose ester under consideration. The composition in per cent acetyl is plotted along the line "AB" and the per cent higher acyl (such as propionyl or butyryl) is plotted along the line AC. The points ta, tp and tb represent cellulose triacetate, tripropionate and tributylate, respectively. The line connecting ta and tb represents fully esterified mixed esters of acetic and butyric acid and the line connecting ta and tp represents fully esterified mixed esters of acetic and propionic acids. Hydrolyzed mixed esters fall within the areas lying above the fully esterified products.

On this chart are outlined areas I, II and III. These represent the composition of various mixed cellulose esters which are dissolved at elevated temperatures by propylene chloride alone or propylene chloride and butylene chloride, with or without ethylene chloride, or butylene chloride with ethylene chloride, to give solutions which produce the desired self-supporting gels upon cooling.

More specifically, area II represents compositions which may be made to exhibit this behaviour with propylene chloride alone as the solvent. Area I represents compositions which are not operative with propylene chloride alone but in which some ethylene chloride must be present. Ethylene chloride in minor proportions may also be used in compositions in area II to produce reduced temperatures of gelation. Area III also represents compositions in which mixtures of butylene chloride with propylene chloride will be found satisfactory. Propylene chloride or its mixtures with ethylene chloride are not operative in area III since they will dissolve these compositions without heating.

In areas II and III, a mixture of butylene chloride and ethylene chloride, or a mixture of butylene chloride, propylene chloride and ethylene chloride, is also satisfactory. In all mixtures employing ethylene chloride, it constitutes only a minor proportion of the "hot" solvent mixture.

Figure 3:
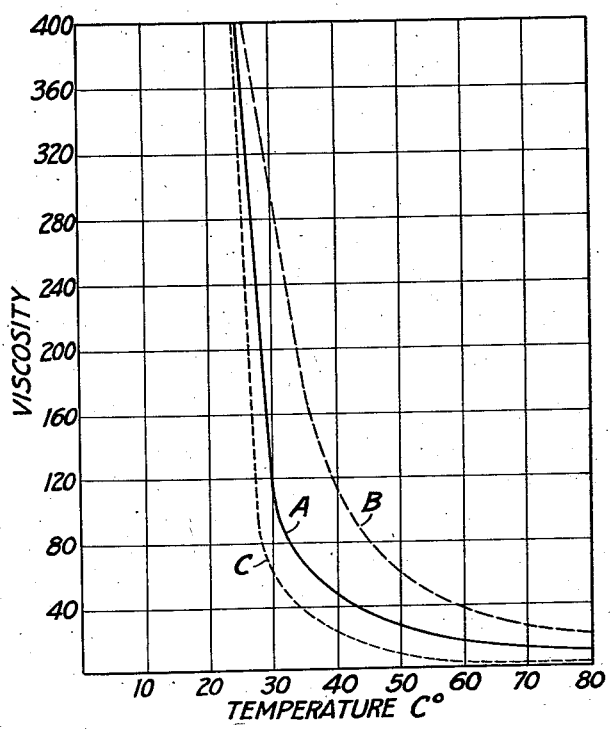
Fig. 3 is a graphical representation of the viscosity changes which occur when certain typical compositions of our invention are cooled from their solution temperatures to or below their gelation temperatures or temperature ranges.

Our invention will better be understood from the following tabulation of "hot" solvents which may be employed with the cellulose mixed organic acid esters designated by the areas I, II and III upon the chart of Fig. 3.

| Area I | Area II | Area III |
|---|---|---|
| (1) Ethylene chloride and propylene chloride | (2) Ethylene chloride and propylene chloride | |
| | (3) Ethylene chloride and butylene chloride | (7) Ethylene chloride and butylene chloride |
| | (4) Ethylene chloride, propylene chloride and butylene chloride | (8) Ethylene chloride, propylene chloride and butylene chloride |
| | (5) Propylene chloride | |
| | (6) Propylene chloride-butylene chloride | (9) Propylene chloride, butylene chloride |

As before stated, ethylene chloride (where employed) constitutes less than half of the "hot" solvent mixture. As a guide to the more exact proportions of the various lower alkylene chlorides employed with the various cellulose mixed organic acid esters, it may be stated that the higher the percent of acyl, or the higher the molecular weight of the acyl radical, the more soluble the ester is; also the more soluble the ester or the more active the solvent the lower will be the gelling temperature and, in fact, if too active a solvent is employed, the gelling phenomenon will not operate to give a self-supporting gel. Thus ethylene chloride alone is too active to be employed in any of the areas I, II, or III of Fig. 3, and in fact, will not give a self-supporting gel with any cellulose acetate or mixed ester. On the other hand, while butylene chloride is too inactive a solvent to be operative, for our purposes, at reasonable temperatures, it is a valuable gelling agent for the cellulose ester when used in connection with propylene chloride or ethylene chloride where the solvent action of either of the latter two must be restrained. This principle of restraining a too active alkylene chloride by means of a gelling agent, it will be noted, is employed by us in arriving at the various "hot" solvent combinations which we employ.

Of the above film-forming compositions we have found that when the above indicated cellulose mixed organic acid esters are dissolved in solvent combinations composed, respectively, of mixtures of ethylene chloride and propylene chloride, and of propylene chloride alone, outstanding results are obtained. In other words, these particular solvent combinations constitute two sub-genuses of our invention which are outstanding. Specifically, the compositions of Examples 2, 5, and 10 given below have been found to give particularly desirable results in the manufacture of photographic film support.

Plasticizers may be used in varying quantities in the above compositions and have a minor effect upon the gelation behavior. Use of triphenyl phosphate in quantities as high as 25% of the weight of the cellulose ester does not produce any measurable change in gelation temperature, stripping time, or other phases of the film-forming operation. Liquid plasticizers used in large quantities usually require a minor adjustment in solvent mixtures, such as a decrease in the quantity of more active solvent by 5–10%.

We have referred to the viscosity characteristics of the various compositions adapted for use in our process, and it is accordingly desirable at this point to describe the method by which viscosity is measured. This is a modification of the widely used "dropping ball method," the procedure being as follows:

The dope under examination is filtered and poured into a test tube having a depth of 150 mm., a diameter of 15 mm. and containing a steel ball $\frac{3}{16}$" in diameter weighing .4400 gram. The tube is filled to the brim with the dope under test and a cork stopper inserted with pressure enough to force air bubbles and excess dope past the cork. A small wire may be placed alongside the cork to facilitate the passage of air bubbles and dope past the stopper. The glass tube carries two scratches positioned exactly 10 cm. apart. The dope-filled tube is then placed vertically in a constant temperature water bath with the stopper down. After the bath and tube have reached equilibrium temperature (usually within a period of one-half to one hour), the tube is quickly inverted and placed in a vertical glass cylinder placed in the water bath. When the bottom of the steel ball reaches a position level with the first scratch, a stop watch is started and the time required for the bottom of the steel ball to reach a position level with the second scratch is measured. The viscosity is recorded as the time in seconds required for the ball to travel this 10 cm. distance between the two scratches.

The viscosities referred to in the specification and in the claims are to be understood as having been determined by the above described method.

Before proceeding to specific examples of our process it is desirable to describe the general aspects of a typical film or sheet-forming procedure and one type of appropriate apparatus for carrying it out.

Figure 1:
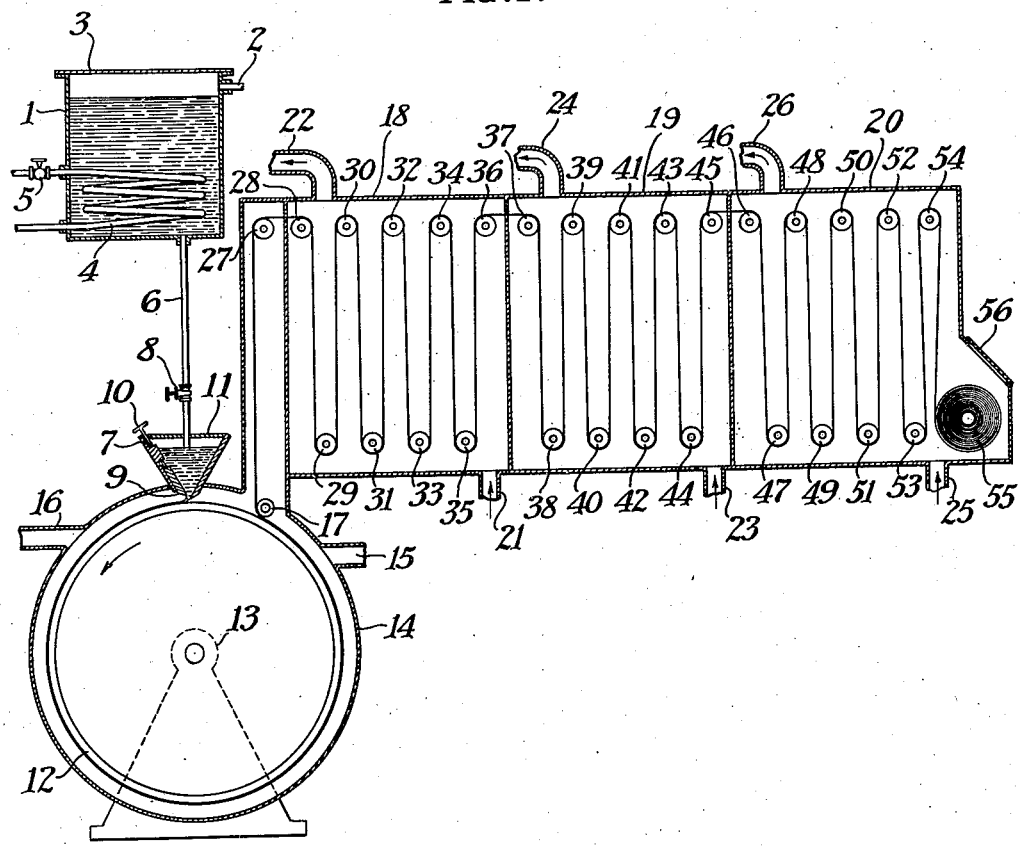
Fig. 1 is a diagrammatic elevational sectional view of a conventional type of device which may be employed for carrying out a typical film-forming operation in accordance with our invention.

Referring to Fig. 1 of the drawings, numeral 1 designates a dope storage or supply tank provided with an inlet conduit 2 for admission of the previously prepared dope. The tank is provided with a removable cover 3 for permitting inspection of the contents and for other purposes and also provided with a heating coil 4 through which a flow of an appropriate heating fluid such as hot water or steam is maintained by means of thermostatically controlled valve 5. The flow of the heated fluid is so regulated as to maintain the dope in the tank 1 at a constant temperature.

Numeral 6 designates a feed conduit (which may be provided with lagging of an appropriate type for preventing heat losses as far as possible) through which the heated dope is passed to a standard form of dope hopper 7, flow of the dope being controlled by means of valve 8.

The dope hopper is provided with an adjustable gate member 9 for controlling the thickness of the dope stream which flows from the hopper. Adjustment of the gate member 9 may be by thumb screw 10 threaded through one wall of the hopper. The hopper is provided with a cover 11 to prevent solvent and heat losses and is also preferably supplied with external or internal heating means (not shown) for maintaining the dope at a constant temperature.

Positioned below the hopper 7 is the coating or casting wheel 12 mounted in suitable bearings 13 and surrounded by air casing 14, the wheel being adapted to rotate in the direction indicated by the arrow. The wheel is provided with appropriate cooling means (not shown) whereby its film-forming surface is cooled to an appropriate temperature equal to or below the gelation temperature of the particular dope employed in a given film-forming operation. Casing 14 is provided with air inlet conduit 15 and outlet conduit 16 for conducting a current of heated air around the wheel counter-currently to the path of the film undergoing formation.

The wheel is driven by appropriate mechanism (not shown) of such nature that any desired rotational speeds may be attained. Numeral 17 designates a conventional stripping roll over which the formed film passes on its way to the curing device, which comprises a plurality of air sections 18, 19, and 20. These air sections are provided, respectively, with air inlet conduits 21, 23, and 25 and with air outlets 22, 24, and 26 which provide a means of conducting heated air through each section in the general direction indicated by the arrows.

Numeral 27 designates a guide roll over which the film passes, after leaving stripping roll 17, on its way to the first air section. Numerals 28, 29, 30, etc., designate a series of rolls in the respective air sections over which the film or sheet material passes on its way to the wind-up 55 located in the last air section 20. These rolls are driven, preferably by means of the so-called tendency drive which permits the film to travel through the air section in a substantially freely supported condition, this type of drive compensating for any longitudinal changes of dimension which may take place in the film material during the curing operation.

The numeral 56 designates a hinged door which gives access to the last air section 20 and through which rolls of the finished product may be removed from time to time.

A typical film-forming operation may be carried out as follows:

An appropriate dope composition, previously thoroughly mixed in another contained at an appropriate temperature, is fed into the mixing tank 1 through the conduit 2. Care is taken to maintain the dope, prior to contact with the wheel surface, at a temperature well above its gelation point and in a readily flowable condition. The warm dope passes by means of conduit 6 into dope hopper 7 from which it flows onto the wheel in a stream, the thickness of which is regulated by appropriate adjustment of gate member 8 to give the desired eventual film thickness, for example, .005 inch.

As previously indicated, the wheel surface is maintained at a temperature equal to or below the gelation temperature or temperature range of the particular dope in question and the wheel is driven at such a peripheral speed as to give the desired speed of film formation. As the dope contacts the cold wheel surface gelation takes place almost immediately, and, at the expiration of a substantially insignificant period of time, the film material has reached a condition in which it may be removed from the wheel at the stripping roll 17. Although it is not necessary to subject the film to any considerable amount of curing on the wheel, it is generally best to remove a certain amount of solvent from the gelled film material at this point in the process. To this end air is admitted to wheel casing 14 through conduit 15 and passes countercurrently around the outside surface of the film, the solvent-laden air being finally conveyed out of the apparatus through conduit 16. The air temperature may be adjusted to or below room temperature or it may be heated to as high as approximately 40° C. or over, the particular temperature depending upon the composition of the dope in question, the wheel speed, and various other factors.

The nature of the dope being such that it sets almost immediately into a rigid gel upon contacting the cold wheel surface, the film may be readily stripped upon reaching stripping roll 17. At this point the film contains a substantial amount of solvent, the exact amount, of course, being dependent on wheel speed, temperature of the casing air and other factors. As will be apparent, when it is practical to operate the wheel at a sufficiently high speed, the film may be removed from the film-forming surface while still containing practically all of its original solvent. Under no circumstances is it necessary to bring the solvent content down to a point below that at which the weight of the solvent equals the weight of the cellulose mixed organic acid ester. Under ordinary circumstances the wheel is operated at such a speed that the film contains anywhere from 50% to 80% of solvent at the time of stripping.

After stripping, the film is conducted into the first air section 18, where it is subjected to the action of a current of air heated, for example, to about 40–60° C. Solvent is removed progressively with travel of the film through the air section. The film upon emerging from the first air section passes immediately into the next air section where it is subjected to the action of air heated to a temperature of about 40–80° C. and finally into the air section 20, where it is subjected to the action of air heated from about 85–95° C. By the time the film reaches the wind-up 55 it has lost substantially all of its original solvent content and is then in suitable condition for use as photographic film support and many other purposes.

Our invention will be more readily understood by reference to a number of specific examples illustrating preferred embodiments thereof.

*Example 1.*—A solution of 100 parts by weight of a cellulose acetate butyrate containing 33.2% acetyl and 11.9% butyryl in 700 parts by weight of a solvent mixture composed of 60% by weight of propylene chloride and 40% of ethylene chloride was prepared by mixing the ingredients with continued stirring at 60° C. A portion of the solution was coated in a thin layer of uniform thickness onto a highly polished film-forming surface having a temperature of about 14° C. The solution set almost immediately to a rigid gel under the influence of the lower temperature. The material was allowed to stand in a current of air at approximately 20° C. for 11 minutes, whereupon it was stripped from the surface and cured to remove volatile solvent. A transparent film of high toughness and tensile strength was obtained.

*Example 2.*—A solution of 100 parts by weight of a cellulose acetate butyrate containing 31.3% acetyl and 16.7% butyryl in 400 parts of a solvent mixture composed of 75% by weight of propylene dichloride and 25% of ethylene dichloride was prepared by mixing the ingredients with continued stirring at 60° C. The solution was then filtered to remove incompletely dissolved particles and fed to the supply tank of a film-forming apparatus such as that illustrated in Fig. 1. The temperature of the dope in the tank was maintained at 60° C.

The dope was admitted to the hopper where its temperature was maintained at about 50° C. The gate of the hopper was so adjusted as to feed a stream of the warm dope to the wheel surface of such thickness as to give an eventual film thickness of .005 inch, the wheel being maintained at a constant temperature of about 15° C. The wheel was rotated at such a speed that the film remained on the film-forming surface for about six minutes during which time a current of air having an inlet temperature of about 30° C. was passed through the space around the wheel in a direction counter-current to that of the movement of the film.

The warm dope, immediately upon coming in contact with the cold wheel surface, was transformed into a non-fluid gel. After completing somewhat more than three-quarters of a revolution on the wheel, the film was stripped from the film-forming surface and was thereafter carried through the three air sections where it was subjected to the curing action of a current of moderately heated air. The air passing through the first air section had an inlet temperature of about 50° C. providing an average temperature in the section of 45° C. The path and speed are such that the film in this section took approximately 16 minutes to travel therethrough. The average temperature of the second air section was 65° C., and of the third section 80° C., the path and speed of the film being such that any given portion thereof remained in these air sections for a period of approximately 16 minutes.

The film at the point of stripping was found to contain about 60% solvent under the particular conditions of coating. The finished film was found to have high tensile strength, high flexibility, a low degree of stretch, and a swell and shrink amplitude of less than .8%.

*Example 3.*—A solution of 100 parts by weight of a cellulose acetate butyrate containing 27.3% acetyl and 20.6% butyryl in 700 parts by weight of a solvent mixture composed of 60% by weight of butylene chloride and 40% by weight of ethylene chloride was prepared by mixing the ingredients with continued stirring at 60° C. This solution was coated in the same manner as illustrated in Example 1, the film-forming surface having a temperature of about 24° C. After remaining on the film-forming surface in a current of air having a temperature of approximately 20° C. for five minutes, the material was then stripped from the surface and cured to remove volatile solvent. A tough transparent film of high tensile strength was thus obtained.

*Example 4.*—A solution of 100 parts by weight of a cellulose acetate butyrate containing 27.2% acetyl and 21.7% butyryl in 600 parts by weight of a solvent mixture composed of 35% by weight of butylene chloride, 35% by weight of propylene chloride and 30% by weight by ethylene chloride was prepared by mixing the ingredients with stirring at 60° C. A portion of the solution was coated in a thin layer of uniform thickness onto a highly polished film-forming surface having a temperature of about 21° C. The solution set almost immediately to a rigid gel under the influence of the lower temperature. The material was allowed to stand in a current of air at approximately 20° for five minutes, whereupon it was stripped from the surface and cured to remove volatile solvent. A transparent film of high toughness and tensile strength was obtained.

*Example 5.*—A solution of 100 parts by weight of a cellulose acetate butyrate containing 27.3% acetyl and 20.6% butyryl in 600 parts of a solvent composed of 100 parts of propylene chloride was prepared by mixing the ingredients with continued stirring at 60° C. A portion of the solution was coated in a thin layer of uniform thickness onto a highly polished film-forming surface having a temperature of about 18° C. The solution set almost immediately to a rigid gel under the influence of the lower temperature. The material was allowed to stand in a current of air at approximately 20° for five minutes whereupon it was stripped from the surface and cured to remove volatile solvent. As in the previous examples, a transparent film of high toughness and tensile strength was thus obtained.

*Example 6.*—A solution was prepared and cast in the form of a film according to the technique described in Example 1, except in this instance, the cellulose ester was a cellulose acetate butyrate containing 27.3% acetyl and 20.6% butyryl and was dissolved in a solvent mixture composed of 10% by weight of butylene chloride and 90% by weight of propylene chloride. The coating surface was maintained at a temperature of about 26° C. and the film remained upon the film-forming surface for five minutes. As in the previous examples, a film satisfactory for use as photographic film support and having a high degree of toughness and tensile strength was obtained.

*Example 7.*—The technique of Example 1 was employed, the solution in this case being composed of a cellulose acetate propionate containing 15.6% acetyl and 32.3% propionyl dissolved in a solvent composed of 600 parts by weight of a solvent mixture consisting of 75% by weight of butylene chloride and 25% of propylene chloride. In this case the film-forming surface was maintained at a temperature of approximately 25° C. and the film remained upon the film-forming surface for a period of one minute. A tough transparent film of high tensile strength was obtained.

*Example 8.*—A solution of 100 parts by weight of a cellulose acetate propionate containing 21.8% acetyl and 26.7% propionyl dissolved in 600 parts by weight of a solvent mixture composed of 45% butylene chloride and 45% propylene chloride and 10% ethylene chloride was prepared by mixing the ingredients with continued stirring at 60° C. A portion of the solution was coated in a thin layer of uniform thickness onto a highly polished film-forming surface having a temperature of about 15° C. The solution set almost immediately to a rigid gel under the influence of the lower temperature. The material was allowed to stand in a current of air at approximately 20° for 11 minutes, whereupon it was stripped from the surface and cured to remove volatile solvent. A transparent film of high toughness and tensile strength was obtained.

*Example 9.*—The film-forming technique of Example 1 was carried out except that the solution was made up of 100 parts by weight of a cellulose acetate propionate containing 15.6% acetyl and 32.3% butyryl dissolved in 600 parts by weight of a solvent mixture composed of 95% by weight of butylene chloride and 5% by weight of ethylene chloride. The film-forming surface was maintained at a temperature of 20° C. and the film was stripped after a period of five minutes. A satisfactory, highly tough film of good tensile strength was obtained.

*Example 10.*—The film-forming technique of Example 1 was carried out except that the solution in this case was made up of 100 parts by weight of a cellulose acetate propionate containing 30.5% acetyl and 15.3% propionyl dissolved in 500 parts by weight of a solvent mixture composed of 75% propylene chloride and 25% ethylene chloride. The film-forming surface was maintained at a temperature of about 25° C. and the film was permitted to remain on the surface for a period of five minutes. As in the previous examples, a transparent film of high toughness and tensile strength was obtained.

In this connection, it is important to note that the matter of permissible solvent content at stripping is one of the distinguishing features of our invention. Film or sheet material produced according to the above-mentioned prior art methods must be cured on the film-forming surface until residual solvent is reduced to or below about 10–20% before satisfactory stripping can be attained. Our compositions, on the other hand, are of such nature that they may be satisfactorily stripped from the film-forming surface while containing anywhere from 50 to 80% solvent. It will thus be seen that the film or sheet material of the instant invention is of a fundamentally different nature than similar products produced from the non-gelling types of dope of the prior art.

The effect on the gelation temperature of an increase in the amount of a more active solvent is illustrated in the following table.

*Table illustrating relation between solvent composition and gelation temperature of a typical cellulose mixed organic acid ester (cellulose acetate butyrate—31.4% acetyl, 15.6% butyryl)*

| Propylene dichloride in solvent per cent | 100 | 90 | 70 | 50 |
|---|---|---|---|---|
| Ethylene dichloride in solvent do | | 10 | 30 | 50 |
| Gelling temperature ° C | 40 | 30 | 25 | 10 |

Sheet material obtained by following the procedure set forth above is found to be outstanding in certain physical properties as compared with sheets or films composed of the same cellulose ester but produced in accordance with the standard prior art methods, namely, by gradual evaporation of solvents from a deposited layer of the film-forming composition. As will be seen from the comparative data in the following table, the most outstanding advantages of our products are increased tensile strength, flexibility, and diminished dimensional swell and shrink of the film in alternately wet and dry condition.

*Table of physical properties of cellulose acetate propionate films coated from different solvents (containing 10% triphenyl phosphate on the cellulose ester)*

| | 100% acetone | 100% ethylene dichloride | Propylene dichloride 85% methanol 15% | Propylene dichloride 60% ethylene dichloride 40% |
|---|---|---|---|---|
| | A | B | C | D |
| Tensile strength kgs | 16.4 | 16.0 | 16.5 | 20.6 |
| Flexibility folds | 7 | 8 | 14 | 19 |
| Stretch per cent | 31 | 30.4 | 32 | 22 |
| Swell and shrink amplitude do | 1.1 | 1.1 | 0.95 | 0.46 |

The above table illustrates the remarkable improvement in physical properties of film produced in accordance with our invention as compared to films produced from the same cellulose ester by conventional evaporative methods of coating or casting. For example, it will be seen that the tensile strength of films A, B, and C, produced according to standard practice, is not above 16.5 kgs., whereas the tensile strength of our product (film D) is 20.6 kg., an increase of about 24%. As to flexibility, the number of folds which film A, B and C will withstand is only 7, 8, and 14, respectively, while the number which our film D will stand is 19 folds, this representing a marked increase in flexibility for our product. The tendency to stretch of our film D is also markedly lower than that of films A, B, and C.

One of the most outstanding differences between films or sheets produced in accordance with our invention, and similar prior art products, is the fact that they have an extremely low "swell and shrink amplitude," that is, the property of undergoing linear dimensional change in alternately wet and dry condition. As is well known, the swell and shrink characteristics of a photographic film, for example, are of great importance and the most useful films are those having the lowest swell and shrink amplitude. This is of particular importance in films which are to be used for X-ray, portrait, or aerial photography where sheets of appreciable size are employed. Obviously films of high swell and shrink characteristics tend toward internal unevenness which is due, either to buckling of the film in the center, or to curling of the edges— phenomena which are absent from films having a low swell and shrink amplitude and the ability to lie flat without curling. Other types of film which are used in long strips, such as rolls of Cine films, are difficult to process—such materials if of high swell and shrink characteristics, exhibiting appreciable shrinkage after removal from developing or washing solutions, at which time the films are usually mounted on a drying rack. Under such conditions these films tend to become severely tightened resulting in distortion of the film base and the photographic image carried thereby.

It has been proposed to reduce the tendency of such films to swell and shrink by incorporating therein a fairly large amount of a water-repellent plasticizer. However, the use of such a plasticizer in amounts sufficient to reduce the swell and shrink tendency to any appreciable extent has a detrimental effect on the physical properties of the film, causing a loss in tensile strength and an increase in stretch. Another alternative is to employ a mixed cellulose organic acid ester and introduce into such ester a relatively high proportion of higher acyl groups. This method, similarly to the introduction of a high proportion of plasticizer, is also unsatisfactory, since, when an appreciable reduction in swell and shrink is obtained, a definite loss in tensile strength occurs and the resulting film is too limp for satisfactory use.

The film or sheet material produced in accordance with our invention, on the other hand, has in the case of cellulose mixed organic acid esters such as cellulose acetate propionate, cellulose acetate butyrate and the like, unexpectedly low swell and shrink amplitude. This amounts to a swell and shrink amplitude as low as .4% or less when plasticized with triphenyl phosphate, for example, as compared to more than .8% for material produced from the same type of esters by the prior art evaporative methods.

It is one of the features of our invention that we are enabled to produce a film or sheet from a cellulose mixed organic acid ester of the various types, having good tensile strength and durability and containing, for example, as little as 10% or less, based on the weight of the ester, of a plasticizer, and obtain material having an unexpectedly low swell and shrink amplitude ranging from about .4% to about .8%, in most cases less than .8%—hitherto unattainable results. In fact, these same materials when coated by the prior art method give swell and shrink amplitudes from 20% to 100% greater than the values obtained by our method. In other words, for any given plasticizer content and a given ester, we are enabled to obtain a film having a markedly lower swell and shrink amplitude than that of a film produced from the same ester by the evaporative method of solidification, also a hitherto unattainable result. Furthermore, we are the first, so far as we are aware, to produce any type of cellulose organic acid ester film of good tensile strength and rigidity, regardless of method of production and plasticizer content, having a swell and shrink amplitude of below about .6%.

As a further example of the improved results obtainable by our process, we are enabled to produce a sheet or film adapted for use as photographic film base from cellulose organic acid esters with or without a plasticizer, having a swell and shrink amplitude below about .8%, which value is at least 20% less than that which would be obtained if the same film material were dissolved in solvents at room temperature, coated, for example, on a glass plate to the same thickness, set or solidified by evaporating the solvent in dry air at room temperature, and curing in an oven at elevated or moderately elevated temperature.

While we do not confine ourselves to any particular theory or explanation of the results obtained, it appears that both the facility and speed with which our new products may be removed from the film-forming surface and their specific physical properties, particularly high tensile strength and flexibility and extremely low swell and shrink amplitude, are due to the fact that they set to a non-fluid state before curing. It is possible that the low linear dimensional change taking place when such films are alternately wet and dry may be due to a change in thickness rather than to a change in the length of the film on absorption of moisture, the swell and shrink very probably being dependent upon the mechanism by which the film itself was formed.

In order that the above-mentioned swell and shrink amplitude figures may be more fully understood, the test for measuring this property of film or sheet material is given in detail below.

*Swell and shrink amplitude test*

A sample of film or sheeting is conditioned and measured both before and after processing in a constant humidity room at a relative humidity of 50%, or as close thereto as is possible, and at a dry bulb thermometer reading of 70° F. For photographic film support of cine positive thickness (.0055 inch) or less, the time of conditioning before processing should not be less than 1¼ hours; after processing not less than 2¼ hours. Film support of X-ray thickness (.008–.009 inch) should be conditioned at least 2¼ hours before processing and 3–5 hours after processing. Sheeting of thickness greater than .009 inch should be conditioned longer or until equilibrium is established. An emulsion coated film material should be conditioned for at least 2½ hours both before and after processing.

Strips 15 inches long and 1½ inches wide are cut from the film material. Usually two strips from each sample lengthwise of the film material and two strips widthwise are used for the test and two sets of perforations are made in each strip. These strips are perforated on a punch and die perforating machine, the holes being approximately 10 inches apart. Measurements from outside edge to outside edge of the perforation holes are taken. Thus a reading, if immediately taken, should be zero on the gauge. The gauge employed is graduated in thousandths of an inch and, since the perforations are 10 inches apart, the percentage of dimensional change may be read directly from the gauge by merely moving the decimal point one place to the right.

The strips are conditioned at 50% relative humidity and measured. They are then tacked loosely on a wooden rack and placed in a constant temperature thermostatically controlled water bath at 100° F. and left for 17 hours. The samples are then wiped to remove excess moisture and reconditioned at 50% relative humidity and measured again and the dimensional change computed. This test measures the irreversible shrinkage, if any, due to loss of solvent from the film material and also that due to the release of internal mechanical strains.

The samples are then placed in a water bath at 125° F. for 30 minutes, spacing them in and out a minute or so apart to allow time for measuring. Care is taken to measure as speedily as possible after the removal from the water after giving them a quick wipe with a towel to remove surplus water as shrinkage takes place almost instantly. The sample is then placed in an oven at 125° F. for one hour, then taken out and measured. This cycle is repeated three times or until the difference between the wet and dry readings becomes constant. The difference between the last wet and dry readings in percentage is the per cent swell and shrink amplitude. This test measures the permanent, characteristic tendency of the film material to swell and shrink under the influence of absorbed and desorbed moisture, the difference between the lengthwise and widthwise measurements representing the amount of non-uniformity in the structure lengthwise and widthwise.

The nature of our film-forming compositions will be more readily understood by reference to Fig. 3 of the drawings which illustrated graphically the sudden change in viscosity which our solutions undergo upon lowering the temperature. Curve A was plotted from viscosity determinations made at various temperatures upon the film-forming composition of Example 2. It will be noted that the curve rises gradually as the solution is cooled from 70° C. and that upon approaching the temperature range of 30° to 40° C., a very marked increase in viscosity takes place. Continued cooling below about 30° C. results in extreme viscosity and gelation with the production of a rigid, non-fluid mass. By employing varying concentrations of the cellulose ester in solution, the character of the curve is found to change somewhat. The viscosity characteristics of a slightly more concentrated solution of the same cellulose ester in the same solvent combination when plotted gave curve B, while a lower concentration of the cellulose ester gave the data for curve C.

It will be apparent that many additions to and variations in the above-outlined procedure are possible within the scope of our invention. For example, if one desires to carry out setting of the film at or above room temperature, one may either employ a solvent combination in which there is an increased amount of less active solvent, for example, propylene dichloride, or one may employ a given solvent combination and increase the concentration of the cellulose ester in the solution, or employ both of these expedients. Conversely, the opposite variations in procedure may be made if it is desired or practical to employ lower temperatures.

It will be seen from the above examples that no hard and fast rules can be laid down as to the composition of our film-forming solutions for all purposes, since the composition of a given solution will be adjusted in accordance with the particular conditions of coating, stripping and curing which are to be employed. In general, it may be said that for a practical process a given composition should be, in accordance with our invention, such that the cellulose derivative in question goes into solution at temperatures at or above 50° C. and remains fluid above that temperature. It should also be such that upon cooling it experiences a rather sharp increase in viscosity within a comparatively narrow temperature range of about 20° C.

It will be apparent that in a practical film-making operation many variations in the solution temperature, wheel temperature, wheel casing air temperature, curing temperature, wheel speed, and many other details of the process may be made within the scope of our invention. As previously indicated, when employing compositions which are solutions above 50° C., the wheel temperature may be in the neighborhood of 10° to 20° C., or at least sufficiently low to bring the dope to, and preferably below its gelation temperature.

At this point it may be well to discuss gelation temperature. By this term we do not necessarily refer to an exact temperature, but rather to a maximum temperature below which the cooling solution or dope undergoes a marked and rather sudden increase in viscosity. While no exact maximum can be specified which will cover all possible cases, we may say that gelation or solidification of those compositions which we have found most satisfactory takes place at temperatures below about 40° C.

The temperature of the wheel casing air, that is, the temperature employed to effect initial curing may also vary, as may the temperatures employed for curing after stripping. It is one of the advantages of our invention, however, that due to the peculiar character of our film-forming compositions which enables them to readily lose solvent, curing may be effected at considerably lower temperatures than those customarily employed in film-making operations.

In general, the curing after stripping of sheet or film material produced in accordance with our invention may be carried out as set forth above by standard curing procedures, that is, by conducting the material through appropriate curing chambers where it is subjected to the action of air maintained at elevated or moderately elevated temperatures. It is desirable to subject the film material to low tension during the curing operation in order that the final product may have the desired physical properties. In fact, the sheet or film material produced in accordance with our invention should be subjected to the least tension possible during curing. This will be particularly desirable in those cases in which the film, after stripping, contains a very high proportion of the original solvent content.

Although our process finds particular application in the manufacture of photographic film support, it is broadly applicable to the manufacture of other types of sheeting, particularly thin sheeting adapted for wrapping purposes.

Our process has many advantages over known film-making processes, but the most outstanding advantage is the tremendous increase in speed of film formation obtainable thereby. While we have referred to stripping times of anywhere from a minute or two to five or six minutes, there is no actual theoretical limit to the stripping time, short of zero. In other words, according to our process, film or sheeting may be stripped almost immediately after coating. It will be appreciated, however, that the actual speed of a given practical film-making operation will be considerably lower than that theoretically obtainable. The operation may be slowed down by the practical necessity or desirability of applying various subbing or backing treatments to the film support during the manufacturing operation. As a general proposition, it may be stated that the film-making speeds obtainable by our process are far beyond anything which has thus far been obtained in the film-making industry. For example, anywhere from ten to twenty minutes are required to cast and strip a film under published procedure, whereas film may be cast and stripped by our process within a minute or even less from the time of deposition of the film-forming composition.

One of the distinguishing and unusual features of our invention is the fact that, due to their peculiar composition and characteristics, satisfactory gelling of our film-forming compositions is quite independent of the thickness of the deposited layer, although the thicker the layer, the lower is the casting speed due to the relatively lower heat transference of thick layers as compared to thin layers. We may, however, produce films or sheets anywhere from a few ten thousandths inches or less to almost any desired thickness. It will thus be seen that our process is adapted, not only for the manufacture of photographic film support and even much thinner types of sheeting, such as those employed for wrapping purposes, but also for the manufacture of sheets adapted for use in the fabrication of laminated glass, container stock, and many other products.

What we claim is:

1. A high speed gelation process of making sheeting suitable for photographic film base which comprises dissolving at a temperature above 50° C. a cellulose mixed organic acid ester having a total acyl content of not less than about 43% selected from the group consisting of cellulose acetate propionates containing from 8 to 35% of propionyl and cellulose acetate butyrates containing from 8% to 35% of butyryl, in a liquid which is a solvent for the said cellulose mixed organic acid ester only at a temperature above 50° C. and in a weight of such liquid, greater than the weight of the cellulose ester dissolved, which will give a solution which at a temperature within the range of 10–50° C., will form a clear, transparent, self-supporting gel and which liquid is selected from the group consisting of (1) ethylene chloride and propylene chloride, (2) ethylene chloride and butylene chloride, (3) ethylene chloride, propylene chloride and butylene chloride, (4) propylene chloride, and (5) propylene chloride and butylene chloride, casting the said solution from a supply thereof having a temperature above its gelation temperature in the form of a film at a temperature of 10–50° C. on a film-forming surface, stripping the film from the film-forming surface while containing at least 50% solvent and removing residual solvent from the film.

2. A high speed gelation process of making sheeting suitable for photographic film base which comprises dissolving at a temperature above 50° C. a cellulose mixed organic acid ester having a total acyl content of not less than about 43% selected from the group consisting of cellulose acetate propionates containing from 8% to 25% of propionyl and cellulose acetate butyrates containing from 8% to 25% of butyryl, in a liquid which is a solvent for the said cellulose mixed organic acid ester only at a temperature above 50° C., and in a weight of such liquid, greater than the weight of the cellulose ester dissolved, which will give a solution which at a temperature within the range of 10–50° C., will form a clear, transparent, self-supporting gel and which liquid is composed of a mixture of ethylene chloride and propylene chloride, casting the said solution from a supply thereof having a temperature above its gelation temperature in the form of a film at a temperature of 10–50° C., on a film-forming surface, stripping the film from the film-forming surface while containing at least 50% solvent and removing residual solvent from the film.

3. A high speed gelation process of making sheeting suitable for photographic film base which comprises dissolving at a temperature above 50° C. a cellulose acetate butyrate containing 31.3% acetyl and 16.7% butyryl in a solvent mixture which is a solvent for the ester only at a temperature above 50° C., and in a weight of such liquid, greater than the weight of the cellulose ester dissolved, which will give a solution which at a temperature within the range of 10–50° C., will form a clear, transparent, self-supporting gel, said liquid being composed of 75% by weight propylene chloride and 25% of ethylene chloride, casting the solution from a supply thereof having a temperature above its gelation temperature in the form of a film at a temperature of about 15° C. on a film-forming surface, stripping the film while containing at least 50% solvent from the film-forming surface and removing residual solvent from the film.

4. A high speed gelation process of making sheeting suitable for photographic film base which comprises dissolving at a temperature above 50° C. a cellulose mixed organic acid ester having a total acyl content of not less than about 43% selected from the group consisting of cellulose acetate propionates containing from 15% to 25% of propionyl and cellulose acetate butyrates containing from 15 to 25% of butyryl, in a liquid which is a solvent for the said cellulose mixed organic acid ester only at a temperature above 50° C., and in a weight of such liquid, greater than the weight of the cellulose ester dissolved, which will give a solution which at a temperature within the range of 10–50° C., will form a clear, transparent, self-supporting gel and which liquid is composed of propylene chloride, casting the resulting solution from a supply thereof having a temperature above its gelation temperature in the form of a film at a temperature of 10–50° C.

5. A gelable composition comprising a cellulose mixed organic acid ester having a total acyl content of not less than about 43% selected from the group of cellulose acetate propionates containing from 8% to 35% of propionyl and cellulose acetate butyrates containing from 8% to 35% butyryl dissolved in a liquid which is a solvent for the said cellulose mixed organic acid ester only at a temperature above 50° C., said liquid being selected from the group consisting of (1) ethylene chloride and propylene chloride, (2) ethylene chloride and butylene chloride, (3) ethylene chloride, propylene chloride and butylene chloride, (4) propylene chloride and (5) propylene chloride and butylene chloride, and said liquid being of a weight greater than the weight of the cellulose ester dissolved, which will give a solution which will form a clear, transparent, self-supporting gel at a temperature within the range of 10–50° C. which at that temperature is sufficiently strong and resistant to deformation to permit handling while containing more than 50% solvent.

6. A gelable composition comprising a cellulose mixed organic acid ester having a total acyl content of not less than about 43% selected from the group of cellulose acetate propionates containing from 8% to 25% of propionyl and cellulose acetate butyrates containing from 8 to 25% butyryl dissolved in a liquid which is a solvent for the said cellulose mixed organic acid ester only at a temperature above 50° C., said liquid being composed of a mixture of ethylene chloride and propylene chloride, and said liquid being of a weight greater than the weight of the cellulose ester dissolved, which will give a solution which will form a clear, transparent, self-supporting gel at a temperature within the range of 10–50° C. which at that temperature is sufficiently strong and resistant to deformation to permit handling while containing more than 50% solvent.

7. A gelable composition comprising a cellulose acetate butyrate containing 31.3% acetyl and 16.7% butyryl in a liquid which is a solvent for the ester only at a temperature above 50° C., said liquid being composed of 75% by weight of propylene chloride and 25% of ethylene chloride, and said liquid being of a weight greater than the weight of the cellulose ester dissolved, which will give a solution which will form a clear, transparent, self-supporting gel at a temperature within the range of 10–50° C. which at that temperature is sufficiently strong and resistant to deformation to permit handling while containing more than 50% solvent.

8. A gelable composition comprising a cellulose mixed organic acid ester having a total acyl content of not less than about 43% selected from the group of cellulose acetate propionates containing from 15 to 25% of propionyl and cellulose acetate butyrates containing from 15 to 25% butyryl dissolved in a liquid which is a solvent for the said cellulose mixed organic acid ester only at a temperature above 50° C., said liquid being composed of propylene chloride, and said liquid being of a weight, greater than the weight of the cellulose ester dissolved, which will give a solution which will form a clear, transparent, self-supporting gel at a temperature within the range of 10–50° C. which at that temperature is sufficiently strong and resistant to deformation to permit handling while containing more than 50% solvent.

9. A high speed gelation process of making sheeting suitable for photographic film base which comprises dissolving at a temperature above 50° C. a lower aliphatic acid ester of cellulose in a volatile organic liquid which is a solvent for the cellulose ester only at a temperature above 50° C., and which is of a type and in an amount, greater than the weight of the cellulose ester dissolved, which will give a solution which at a temperature within the range of 10–50° C., will form a clear, transparent, self-supporting gel, casting the solution from a supply thereof having a temperature above its gelation temperature in the form of a film at a temperature of 10–50° C. on a film-forming surface, stripping the film while containing at least 50% solvent and removing residual solvent from the film.

10. A high speed gelation process of making sheeting suitable for photographic film base which comprises dissolving at a temperature above 50° C. a cellulose mixed organic acid ester having a total acyl content of not less than about 43% selected from the group consisting of cellulose acetate propionates containing from 15–35% of propionyl and cellulose acetate butyrates containing from 15–35% of butyryl in a liquid which is a solvent for the cellulose mixed organic acid ester only at a temperature above 50° C., and in a weight of such liquid, greater than the weight of the cellulose ester dissolved, which will give a solution which at a temperature within the range of 10–50° C. will form a clear, transparent, self-supporting gel and which liquid is composed of a mixture of ethylene chloride and butylene chloride, casting said solution from a supply thereof having a temperature above its gelation temperature in the form of a film at a temperature of 10–50° C., on a film-forming surface, stripping the film from the film-forming surface while containing at least 50% solvent, and removing residual solvent from the film.

CHARLES R. FORDYCE.
AUSTIN J. GOULD.